Jan. 13, 1925.

H. H. WRIGHT 1,523,331

TWIN HOOK HIGH SPEED HOIST

Filed July 27, 1921          2 Sheets-Sheet 1

Inventor

H.H.Wright

By C.A.Snow&Co.

Attorneys

Patented Jan. 13, 1925.

1,523,331

UNITED STATES PATENT OFFICE.

HAL H. WRIGHT, OF LISBON, OHIO.

TWIN-HOOK HIGH-SPEED HOIST.

Application filed July 27, 1921. Serial No. 487,905.

*To all whom it may concern:*

Be it known that I, HAL H. WRIGHT, a citizen of the United States, residing at Lisbon, in the county of Columbiana and State of Ohio, have invented a new and useful Twin-Hook High-Speed Hoist, of which the following is a specification.

This invention relates to a high speed hoist having a pair of load engaging hooks whereby loads of considerable length can be lifted from more than one point. Another object is to provide a hoist of this character which is compact, durable and efficient, and can be manipulated readily.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1:
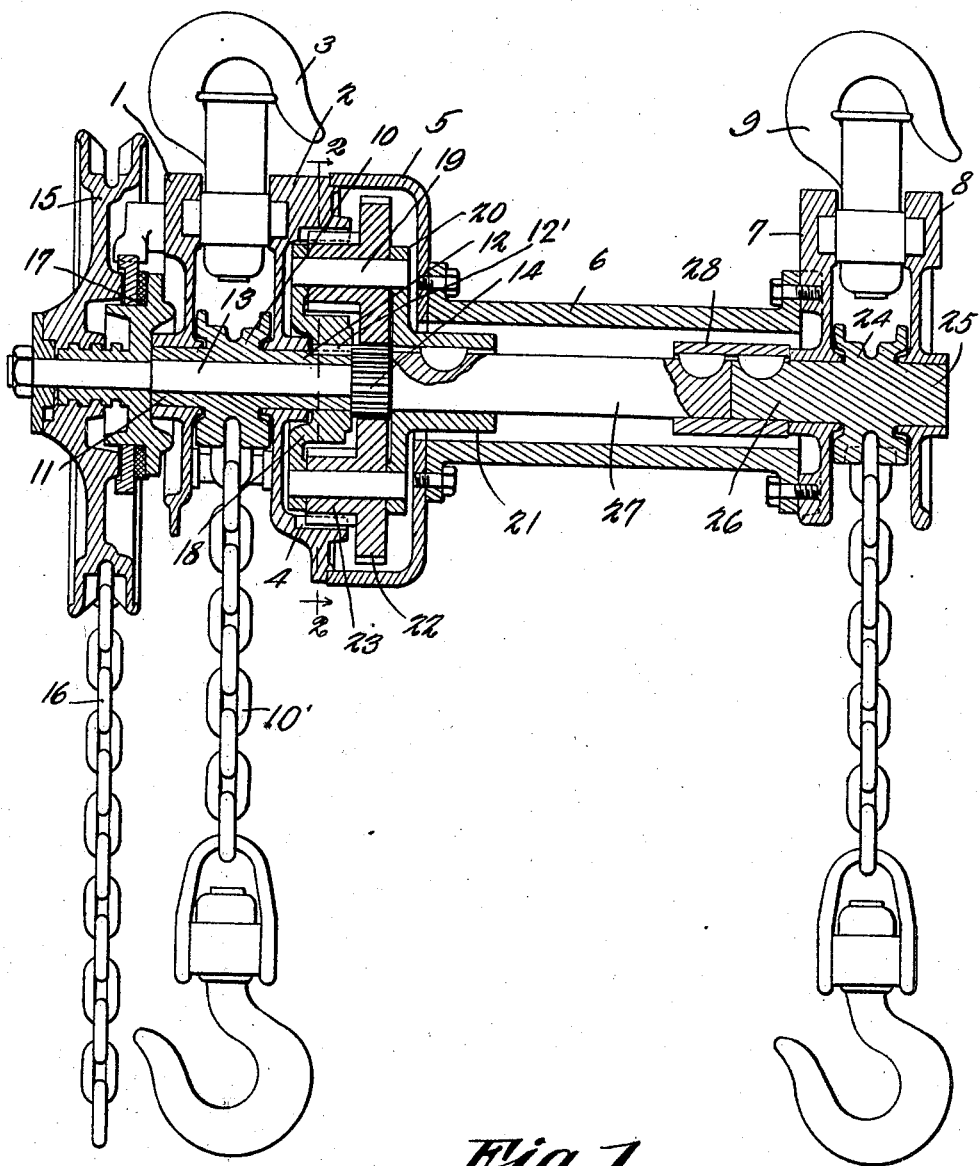
Figure 1 is a vertical longitudinal section through the hoist.
Figure 2:
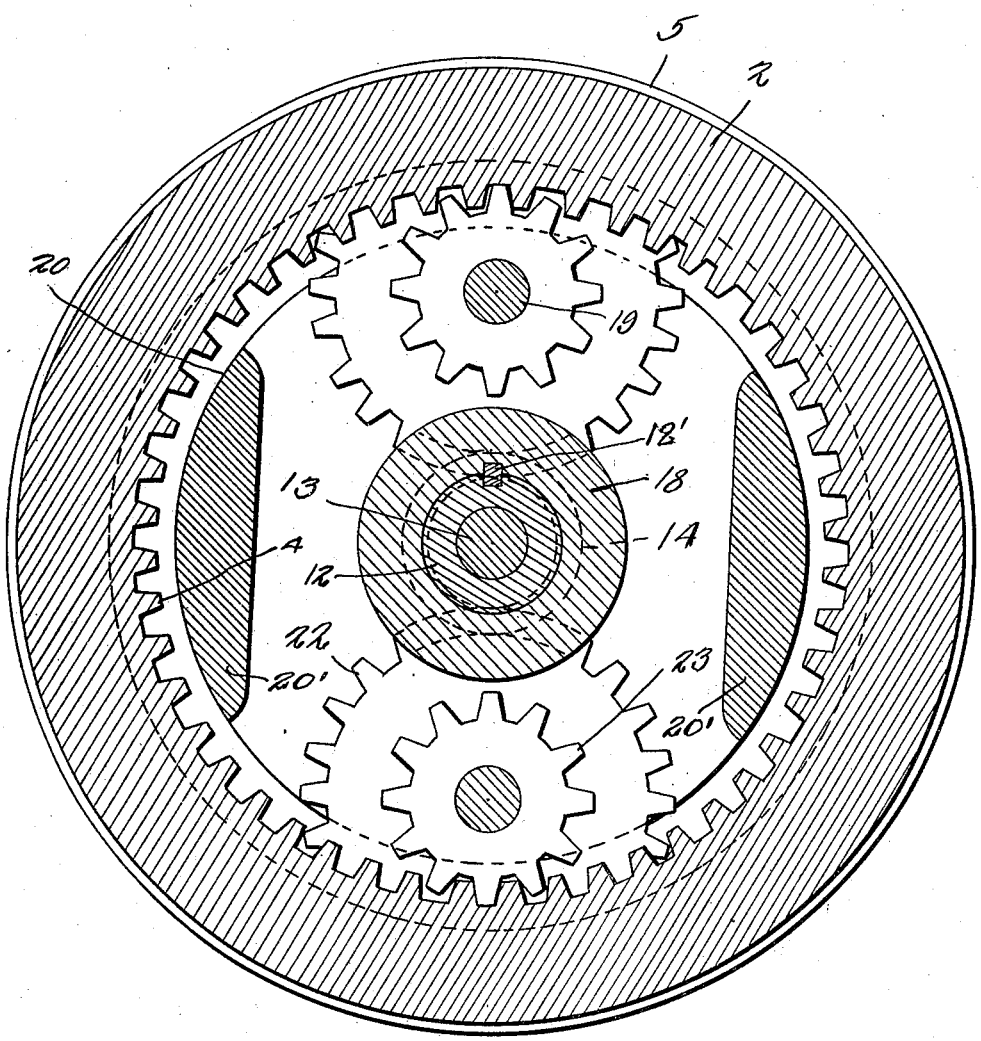
Figure 2 is an enlarged section on line 2—2, Figure 1.

Referring to the figures by characters of reference 1 and 2 designate hangers or castings, the same engaging a hook 3 or the like and the hanger 2 being formed with an internal gear 4. This hanger 2 is also engaged by a housing 5 connected to one end of a tubular extension 6 the other end of which is attached to a hanger 7 disposed oppositely to and spaced from another hanger 8, the two hangers 7 and 8 being engaged by a supporting hook 9 or the like.

A load wheel 10 engaged by a chain 10' is supported between the hangers 1 and 2 and has its hub extended laterally as at 11 and 12. Mounted for rotation within this hub is the main or central driving shaft 13 having a pinion 14 secured on that end thereof within the housing 5 while the other end of the shaft supports a pocket wheel 15 engaged by a hand chain 16 and this pocket wheel is provided with the usual friction locking means indicated generally at 17 for coupling the wheel to the shaft 13. Inasmuch as this locking means constitutes no part of the present invention but is well known in the art, it is not deemed neccessary to enter into a detailed explanation thereof.

Keyed or otherwise fixedly secured, as at 12' to one of the extensions of the hub 12 and close to the pinion or gear 14 is a disk 18 mounted for rotation in the space surrounded by the internal gear 4. This disk is engaged at desired intervals by bearing shafts 19 also engaging a flange 20 extending around a sleeve 21. This flange 20 is cast integral with the disk 18, being joined thereto by connecting portions 20'. Gears 22 are journaled on the shafts 19 and mesh with the pinion 14 and each of these gears has a side pinion 23 which meshes with the internal gear 4. Obviously when the shaft 13 is rotated by the rotation of the pocket wheel 15 motion will be transmitted therefrom through pinion 14 to the gears 22 and the pinions 23 which rotate these gears will thus travel along the internal gear 4 and cause the disk 18 to rotate the wheel 10.

A load wheel 24 is mounted between the hangers 7 and 8 and has its hub extended laterally and bearing within these hangers, as shown at 25 and 26 respectively. An extension shaft 27 is extended into the sleeve 21 and keyed thereto and abuts against one of the hub extensions 26, there being a sleeve 28 mounted on the extension 26 and the adjacent end of the shaft 27 and which sleeve is keyed to both of the parts therein. Thus it will be seen that when the disk 18 is rotated in the manner hereinbefore described and the wheel 10 is correspondingly rotated, the shaft 19 will cause the sleeve 21 and its flange 20 to rotate with the wheel 10 and motion will therefore be transmitted through the extension shaft 27 to the wheel 24 so that said wheel will operate synchronously with the wheel 10. It is to be understood that the structure can be made of any desired length by substituting extension shafts 27 of different lengths. While it is preferred to use the tubular housing 6 because of the added rigidity given to the structure, it is to be understood that this housing may be dispensed with if so desired.

While the disk 18 has been shown keyed directly on the hub extension of the wheel 10, it is to be understood that the gears 22 and pinions 23 can be connected in any other desired manner to the wheel 10 so as to rotate bodily with said wheel.

By providing a hoist such as described any load which could properly be lifted at two points can be satisfactorily elevated.

Obviously more than one supplemental wheel 24 can be used in which event another extension shaft 27 may be coupled to the hub extension 25 in the same manner as has been shown at the connection between the parts 27 and 26.

What is claimed is:—

1. The combination with a load wheel, hangers supporting the same, an internal gear formed with one of the hangers, and a housing engaging said hanger, of a driving shaft journaled within the load wheel, a member revoluble with the load wheel, a pinion meshing with the internal gear and carried by said member, a gear upon the driving shaft, gears rotatable with the pinions and meshing with the gear on the driving shaft, supplemental hangers, supporting means therefor, a supplemental load wheel journaled in the hangers, a connection between the housing and one of said supplemental hangers, and an extension shaft connected to the said member and the supplemental load wheel for transmitting motion to said suplemental load wheel to rotate both of the wheels simultaneously and at the same speed.

2. In a hoist the combination with separate load wheels, hangers for each wheel, and carriage engaging means above each wheel and conncted to the hangers thereof, of a driving shaft extending through and rotatable within one of the load wheels, a member rotatable with said load wheel, gears journaled in said member, a gear on the driving shaft meshing with said gears, an internal gear in one of the hangers supporting the driving shaft, pinions meshing with the internal gear and extending from and concentric with the gears in the member, a tubular housing interposed between the load wheels and detachably connected to one hanger of each wheel, an extension shaft supported within the housing, and means for detachably coupling the extension shaft to said member rotatable with one of the load wheels and to the other load wheel.

In testimony that I claim the foregoing as my own, I have hereto affixed my signature in the presence of two witnesses.

HAL H. WRIGHT.

Witnesses:
L. R. LEWIS,
H. R. HEIM.